No. 12,194. REISSUED JAN. 19, 1904.

W. LINCOLN.

HAY RAKE.

APPLICATION FILED OCT. 27, 1903.

3 SHEETS—SHEET 1.

Witnesses

Inventor

Ward Lincoln by Dyrenforth, Dyrenforth & Lee his Attorneys

No. 12,194. REISSUED JAN. 19, 1904.

W. LINCOLN.

HAY RAKE.

APPLICATION FILED OCT. 27, 1903.

3 SHEETS—SHEET 2.

Witnesses

F. Fleming

C. L. Whipple

Inventor

Ward Lincoln

By Dyer & Otts Dyer & Otts his Attorneys

No. 12,194. REISSUED JAN. 19, 1904.
W. LINCOLN.
HAY RAKE.
APPLICATION FILED OCT. 27, 1903.
3 SHEETS—SHEET 3.
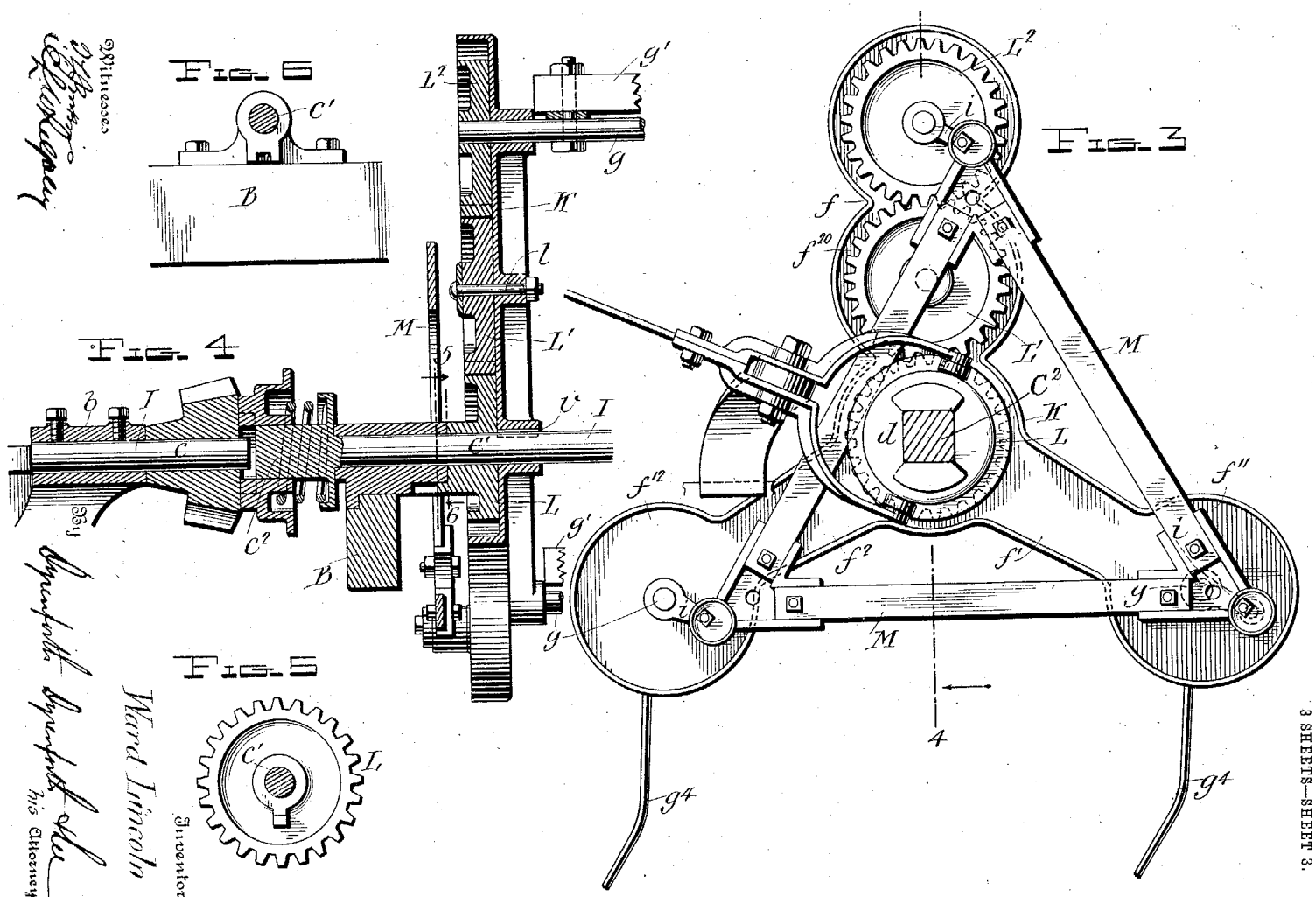
Witnesses
Inventor
Ward Lincoln
By Dyrenforth Dyrenforth & Lee his Attorneys No. 12,194. Reissued January 19, 1904.

UNITED STATES PATENT OFFICE.

WARD LINCOLN, OF ROCKFALLS, ILLINOIS, ASSIGNOR TO THE STERLING MANUFACTURING COMPANY, OF ROCKFALLS, ILLINOIS, A CORPORATION OF ILLINOIS.

HAY-RAKE.

SPECIFICATION forming part of Reissued Letters Patent No. 12,194, dated January 19, 1904.

Original No. 740,769, dated October 6, 1903. Application for reissue filed October 27, 1903. Serial No. 178,800.

*To all whom it may concern:*

Be it known that I, WARD LINCOLN, a citizen of the United States, residing at Rockfalls, in the county of Whiteside, State of Illinois, have invented certain new and useful Improvements in Hay-Rakes, of which the following is a specification.

My invention relates to improvements in the class of side-delivery rakes adapted to be driven in the same direction as the mower and to rake a plurality of swaths into one windrow, thus to produce a windrow of comparatively large size from which to load.

My invention relates more particularly to improvements in the construction of the driving mechanism for the rakes in a machine of the class referred to with the objects of obtaining simplicity of operation and great strength and durability with comparative lightness. To these ends I provide a novel construction of the rotary rake-driving mechanism, which is interposed between the axle of the machine and the rakes to be actuated by the locomotion of the machine to work the rakes.

My improved construction includes an endless pitman so connecting the rake-bars, which are journaled at one end on a rotary head, as to cause the rake-teeth to maintain the required same relative positions throughout the rotation of the rakes. I also provide a sectional construction of the rake-driving rotary shaft affording the advantages, principally, of rendering it independent of the gearing of the drive mechanism and of avoiding springing of the shaft under the severe vibrations to which it is subjected and consequent binding or friction between it and the gearing, which would tend to break the shaft; and I further provide simple means for quickly and conveniently adjusting the pitch of the rake-teeth.

Figure 1:
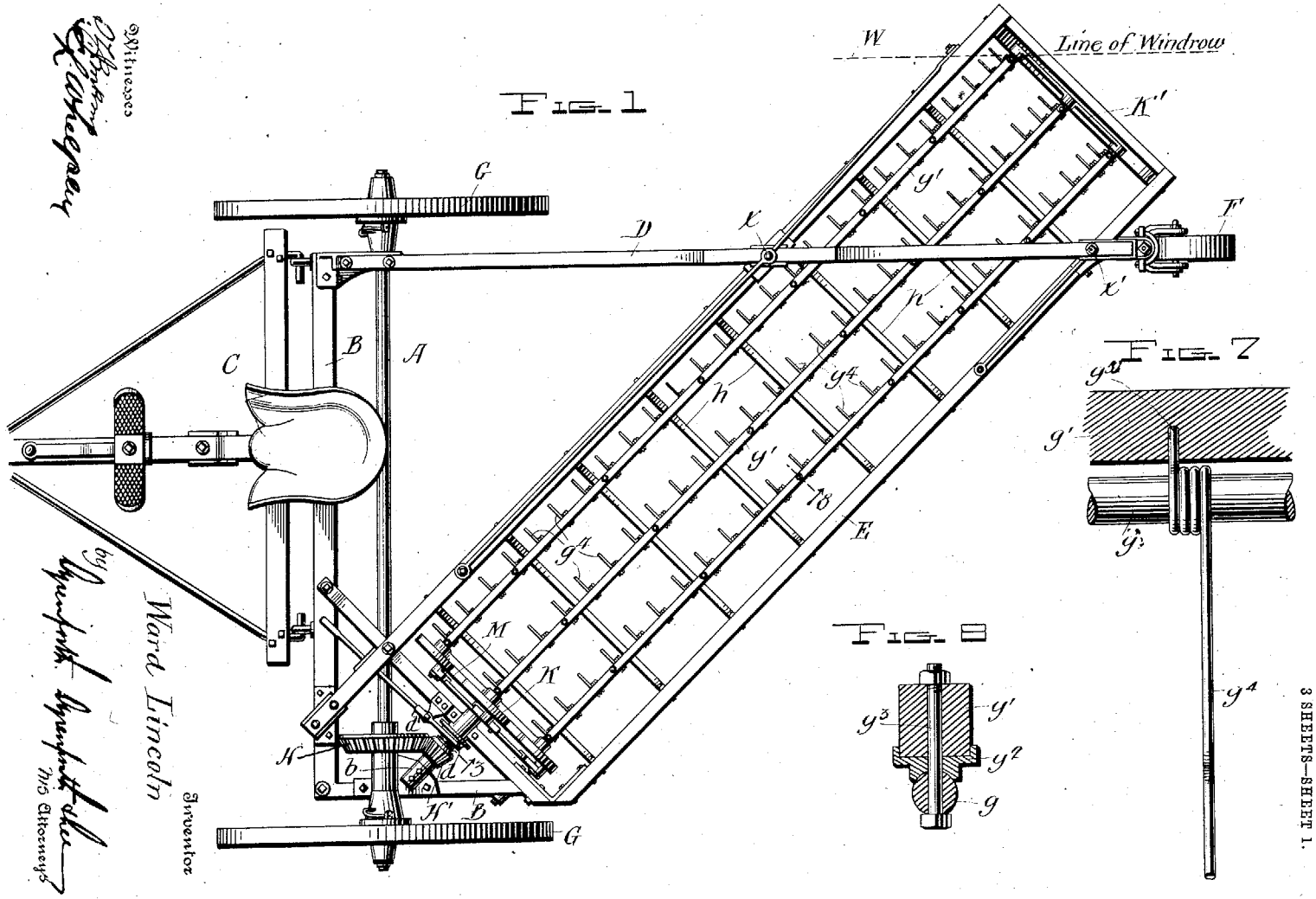
Figure 2:
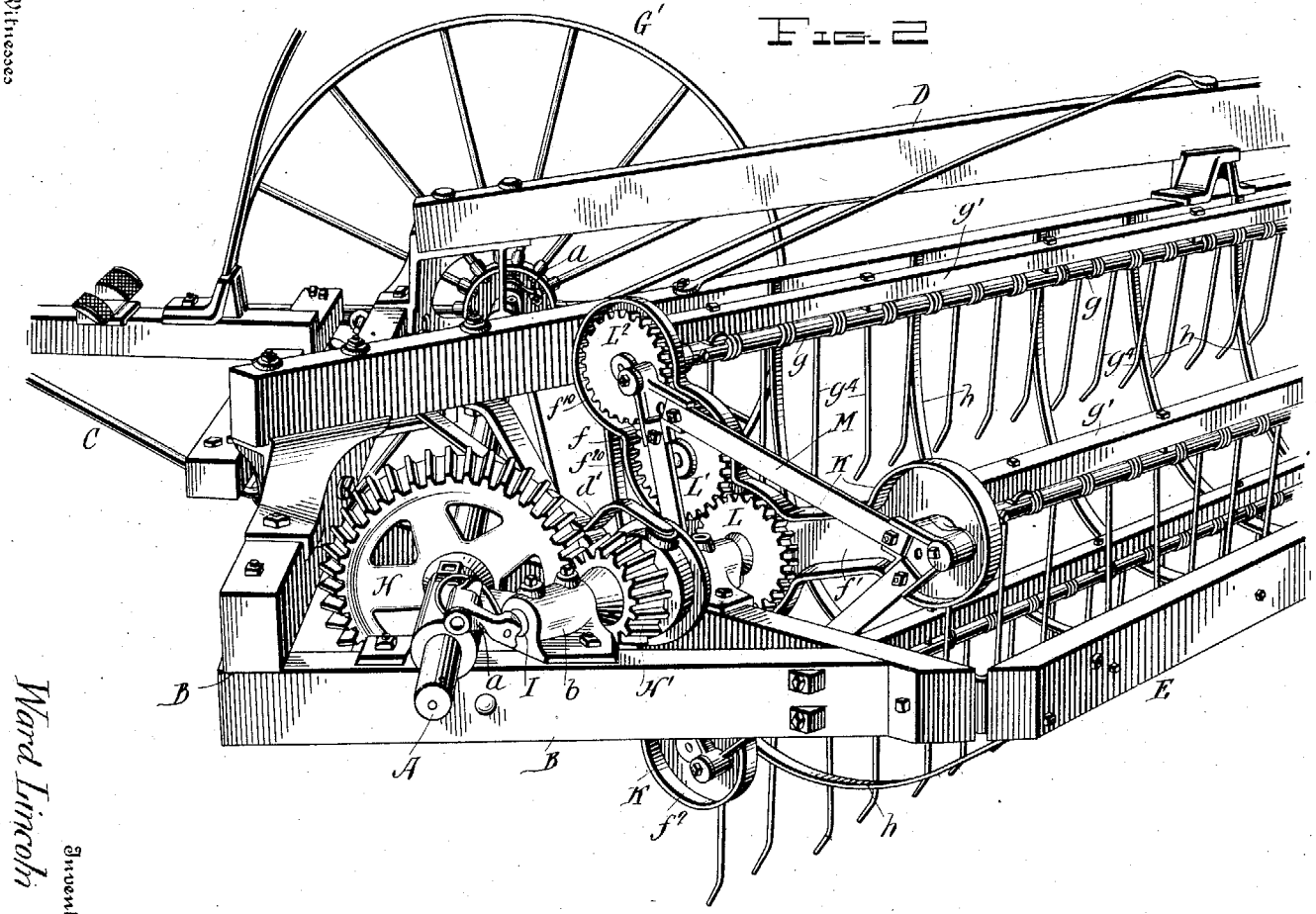

Referring to the accompanying drawings, Figure 1 is a plan view of my improved side-delivery hay-rake. Fig. 2 is a broken perspective view, enlarged over the scale observed in Fig. 1, and mainly showing the rake-driving mechanism. Fig. 3 shows the pitman-actuated parts of the driving mechanism and the gearing by which the pitman is actuated in elevation, the view being taken at the line 3 on Fig. 1, regarded in the direction of the arrow and enlarged. Fig. 4 is a section taken at the line 4 on Fig. 3 and viewed in the direction of the arrow; Fig. 5, a section taken substantially at the line 5 on Fig. 4 and viewed in the direction of the arrow, showing the stationary gear on the drive-shaft about which gear the head revolves carrying the rakes; Fig. 6, a section taken substantially at the line 6 on Fig. 4 and viewed in the direction of the arrow, showing the shaft-bearing; Fig. 7, a broken view, in sectional elevation, of a rake; and Fig. 8, a section of a rake-bar, taken at the line 8 on Fig. 1 and viewed in the direction of the arrow.

A is the axle of the machine carrying and journaled on a frame B, with which suitable draft-rigging C is connected and which may be formed entirely of wood. A hanger-beam D for suspending the rake-frame E is mounted at one end on the frame B and is supported at its opposite end by a caster-wheel F. On opposite ends of the axle are loosely mounted the drive-wheels G and G′, with a pivotal dog-and-ratchet connection $a$ between the hub of each wheel and the axle to cause the wheels in the advance motion of the machine to drive the axle, but to prevent its rotation in backing the machine by the dogs slipping over the ratchet-teeth, all in a known manner. The axle carries near one end a beveled gear H for driving the rotary rake-driving shaft I, hereinafter described. The rake-frame E is represented in oblong rectangular form and is supported at one end, as shown in Fig. 1, on the frame B, and is suspended, as shown at $x$ and $x'$, from the hanger-beam D, where it crosses the latter in its diagonal relation thereto. The shaft I is formed in two sections. The shorter section $c$ is stationarily fastened in a bearing $b$ on the frame B and carries to rotate upon it a beveled pinion H′, meshing with the gear H and releasably connected with the longer section $c'$ of the shaft by a spring-pressed clutch $d$ on the expanded end $c^2$, Fig. 4, of the longer shaft-section and provided with an operating-lever $d'$ for releasing it. The shaft-section $c'$ extends lengthwise through the center of the rake-frame and is journaled on the opposite ends of the latter. It carries to rotate with it a head K, which may be a casting, shown, Fig. 3, as comprising three arms $f$, $f'$, and $f^2$, flanged at their edges on one side and extending at suitable angles from a common center, through which the shaft-section $c'$ passes and to which it is keyed, and having enlarged circular extremities $f^{10}$, $f^{11}$, and $f^{12}$ flanged on one side of the head to afford housings for parts hereinafter described. A similar flanged enlargement $f^{20}$ is formed on the arm $f$ adjacent to its enlarged extremity $f^{10}$, and a flange is formed about the center of the head, all the flanges being connected to extend continuously about the edge of the face of the head K. In the centers of the circular enlargements $f^{10}$, $f^{11}$, and $f^{12}$ are journaled at one end rake-bars, having their opposite ends journaled in a suitable head K' (shown in Fig. 1) and journaled on the shaft-section $c'$, which passes through it into its bearing on the rear end of the frame E. The shape of the head K' is not material, so that it is not shown in the drawings otherwise than by the top edge view in Fig. 1; but it is preferred to provide it in the general "spider" form of the head K, with arms projecting from the center and affording in their outer ends journal-bearings for the rake-bars. These rake-bars are each formed of a cylindrical metal shaft $g$, surmounted longitudinally by a wooden bar $g'$, resting upon it at intervals through the medium of metal shoes $g^2$, with a bolt $g^3$ passing through the shaft, shoe, and bar to secure them rigidly together, and from each shaft $g$ there extend at intervals parallel rake-teeth $g^4$, each formed of wire coiled about the shaft with several laps and having an end entering and confined in a socket $g^5$ in the bar to render the tooth resiliently yielding, thereby to give in encountering obstructions. The rakes, with the heads affording the journal-bearings at their opposite ends, present a resemblance to a reel, about which rigid curved fenders $h$ are shown to extend between the side bars of the frame E.

The head K is keyed, as represented at $v$ in Fig. 4, to the rotary section $c'$ of the shaft I, where the latter passes through its center, and this shaft-section also passes loosely through the center of a stationary gear-wheel L, housed by the flange which surrounds the center of the head K and meshing with an idler gear-wheel L', journaled at the center of the flanged enlargement $f^{20}$ of the head K and meshing in turn with a gear-wheel $L^2$, housed in the flanged enlargement $f^{10}$ of that head and fastened on the end of the rake-bar shaft $g$, journaled therein. The shafts $g$ of the two other rake-bars project through and are journaled in the centers of the enlargements $f^{11}$ and $f^{12}$ of the head K, and each rake-bar shaft, where it projects beyond its journal-bearing in the head K, carries a crank $i$. M is a pitman, shown in its preferred angular form, journaled at each angle upon the wrist-pin of one of the cranks $i$. The illustrated shape of the pitman is triangular, because only three cranks are required to be connected by it in the particular rake device represented in the drawings. However, the pitman may without departure from my invention be of other than angular shape, and if of angular shape the number of angles may equal the number of its points of connection with cranks on rake-shafts, of which the number may exceed three, though it is not desirable to provide a rake device having fewer than three rakes.

The operation is as follows: In the forward travel of the machine the revolving wheels G G' turn the axle A, and with it the gear H, to rotate the pinion H'. When the shaft-section $c'$ is clutched, as it normally is, to the pinion H', rotation of the latter drives the shaft and with it turns the rakes and also revolves the head K about the stationary gear L. By the rotation of the head K the gear L', meshing with the stationary gear, is rotated on its axis and rotates the gear $L^2$ with which it meshes, and thus also the rake-shaft $g$ carrying it. Rotation of this rake-shaft turns with it the crank $i$ upon it, and thus oscillates the pitman M to turn the cranks $i$ on the other rake-shafts, whereby the latter are also rotated. Thus while the rake device or rake-reel is being revolved bodily by the shaft I each rake is also undergoing slow turning with the rake-teeth always maintained in the same relative positions, and the rakes operate successively to advance the loose hay on the ground into a windrow along the line W in the manner of operation of side-delivery hay-rakes of the class to which my improvements relate. To set the rake-teeth to any desired pitch, the gear L' is removed on loosening and withdrawing its pivot-bolt $l$, whereupon the gear $L^2$ may be rotated by hand to turn the rake-shafts through their crank and pitman connection to the desired extent, when the gear L' is replaced in its position of meshing with the gears L and $L^2$ and is readily secured in position by reinserting and fastening the bolt $l$ by its nut. Thus the matter of adjusting the pitch of the rake-teeth is rendered an easy operation which may be performed expeditiously.

From the foregoing description of the construction and operation of the machine it will be apparent that my improvement renders the rake-driving mechanism direct and simple, the power being applied and the driving motion attained with the least possible gearing, thereby reducing to the minimum friction and liability to breakage, that it avoids complicated parts and therefore reduces the liability to get out of adjustment, and that the comparatively slow movement which it imparts to the rake-bars enables three at least of the latter to be used with the advantage over two only of such bars in a machine of the present class of permitting the raking to be performed at slower speed, thereby avoiding whipping off the leaves or threshing the hay, which is an objection to high-speed rakes.

The advantages afforded by my improved driving mechanism are not dependent on the particular construction thereof shown and described, since they may be attained by it with various modifications of that construction. Hence I do not limit my invention in the rake-driving mechanism to the particular construction thereof and combination of its parts herein set forth.

What I claim as new, and desire to secure by Letters Patent, is—

1. In a side-delivery hay-rake, the combination of a wheeled driving-axle carrying a beveled gear-wheel, a shaft having a stationary short section loosely carrying a beveled pinion meshing with said gear-wheel, and a rotatable relatively longer section carrying a plurality of rotatable rakes, a clutch connection between the beveled pinion and the rotatable shaft-section, and means for maintaining the rakes in vertical position throughout their rotation.

2. In a side-delivery hay-rake, the combination of a wheeled driving-axle, a shaft having a short section and a relatively longer section, beveled gearing connected with the driving-axle, a clutch connection between said gearing and the longer shaft-section, a stationary gear-wheel through which the longer shaft-section passes, a plurality of rotatable rakes, a crank-gear-wheel on one of the rake-bars, a gear-wheel meshing with the aforesaid gear-wheel and crank gear-wheel, cranks on the other rake-bars, and an endless pitman connecting the crank gear-wheel and cranks.

3. In a side-delivery hay-rake, the combination with a shaft and means for effecting its rotation, of a gear-wheel and a frame on the shaft, said frame having radial members, rotatable rake-carrying bars journaled in the frame members, a crank gear-wheel on one of said bars, cranks on the other bars, a gear-wheel meshing with the aforesaid gear-wheel and crank gear-wheel and an endless angular pitman connecting the cranks and crank gear-wheel.

4. In a side-delivery hay-rake, the combination with a shaft and means for rotating it, of a frame fixed to said shaft and provided with flanged radial members, a stationary gear-wheel about the shaft at said frame, an intermediate gear-wheel mounted on the frame and meshing with the aforesaid gear-wheel, rake-carrying bars journaled in the ends of the frame members, a crank gear-wheel fixed to one of said bars at the frame member and meshing with the intermediate gear-wheel, cranks fixed to the other bars at the frame members, and an endless angular pitman connecting the cranks and crank gear-wheel and through which the shaft extends.

5. In a side-delivery hay-rake, the combination with a wheeled driving-axle, of a rake device comprising a rigid frame, a shaft journaled on said frame, a plurality of rakes journaled in bearings carried by said shaft and each comprising a rake-bar formed of a shaft having a bar mounted upon it to extend lengthwise thereof and teeth coiled at intervals about said shaft and engaging at one end with said surmounting bar, and driving mechanism for the shaft journaled in said frame and for said rakes, geared to said axle to be actuated by its rotation.

WARD LINCOLN.

In presence of—
JOHN ROYER,
MAUDE POTTER